United States Patent
Tsujimoto et al.

(10) Patent No.: US 6,328,477 B1
(45) Date of Patent: Dec. 11, 2001

(54) TAPERED ROLLER BEARINGS AND GEAR SHAFT SUPPORT DEVICES

(75) Inventors: Takashi Tsujimoto; Yuji Okamoto; Kikuo Maeda, all of Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/448,941

(22) Filed: Nov. 24, 1999

(30) Foreign Application Priority Data

| | | | |
|---|---|---|---|
| Nov. 27, 1998 | (JP) | ................................................... | 10-337396 |
| Nov. 27, 1998 | (JP) | ................................................... | 10-337493 |
| Nov. 30, 1998 | (JP) | ................................................... | 10-339409 |
| Dec. 1, 1998 | (JP) | ................................................... | 10-341953 |
| Dec. 3, 1998 | (JP) | ................................................... | 10-344140 |

(51) Int. Cl.$^7$ ..................................................... F16C 33/46
(52) U.S. Cl. .......................... 384/450; 384/564; 384/565; 384/569; 384/571
(58) Field of Search ..................................... 384/450, 571, 384/569, 565, 564

(56) References Cited

U.S. PATENT DOCUMENTS

| | | |
|---|---|---|
| 5,567,508 | 10/1996 | Murakami . |
| 5,658,082 | 8/1997 | Tsushima et al. . |
| 5,672,014 | 9/1997 | Okita et al. . |

FOREIGN PATENT DOCUMENTS

| | | |
|---|---|---|
| 40 16 492 | 11/1990 | (DE) . |
| 2 351 305 | 12/1977 | (FR) . |
| 2 315 775 | 2/1998 | (GB) . |

*Primary Examiner*—Lenard A. Footland
(74) *Attorney, Agent, or Firm*—Wenderoth, Lind & Ponack, L.L.P.

(57) ABSTRACT

A tapered roller bearing and an automotive gear shaft support device which can ensure a long endurance life even in the state in which debris is mixed. On the surfaces of an outer ring, inner ring, and tapered rollers formed from carburized bearing steel having an oxygen content of 9 ppm or less, carbo-nitrided layers having a carbon content of 0.80 wt % or over, a Rockwell hardness HRC of 58 or over, and a residual austenite content of 25–35 vol % are formed to increase mechanical properties and fatigue characteristics of the parts and to stably maintain the carbo-nitrided layers on the surfaces of the parts to a quality having suitable toughness, thereby markedly improving the endurance life of the tapered roller bearing in a state in which debris mixed.

5 Claims, 10 Drawing Sheets

TAPERED ROLLER BEARINGS AND GEAR SHAFT SUPPORT DEVICES

BACKGROUND OF THE INVENTION

This invention relates to tapered roller bearings and gear shaft support devices for vehicles.

Tapered roller bearings are suitable to support radial load, axial load and combined load. Because of their large load capacity, they are used to support gear shafts of power transmission devices such as differentials and transmissions in automobiles and construction machines.

FIG. 1 shows an automotive differential in which a gear shaft is supported by tapered roller bearings which is one of the embodiments of the present invention. It basically comprises a drive pinion 4 rotatably supported in a housing 1 by two tapered roller bearings 2, 3, a ring gear 5 meshing with the drive pinion 4, a differential gear case 7 carrying the ring gear 5 and rotatably supported in the housing 1 by a pair of tapered roller bearings 6, pinions 8 mounted in the differential gear case 7, and a pair of side gears 9 meshing with the pinions 8. These members are mounted in the housing 1 in which is sealed gear oil. The gear oil also serves as a lubricating oil for the tapered roller bearings 2, 3, 6.

FIG. 10 shows one conventional type of tapered roller bearing. It comprises an outer ring 52 having a conical raceway 51, an inner ring 56 having a conical raceway 53, a large rib surface 54 on the large-diameter side of the raceway 53 and a small rib surface 55 on its small-diameter side, a plurality of tapered rollers 57 rollably arranged between the raceway 51 of the outer ring 52 and the raceway 53 of the inner ring 56, and a retainer 58 keeping the tapered rollers 57 circumferentially spaced a predetermined distance from each other. The distance between the large rib surface 54 and the small rib surface 55 of the inner ring is designed to be slightly longer than the length of the tapered rollers 57.

The tapered rollers 57 are designed to come into line contact with the raceways 51 and 53 of the outer ring 52 and the inner ring 56 with the cone apexes of the tapered rollers 57 and the raceways 51, 53 converging on a point O on the centerline of the tapered roller bearing. By this arrangement, the tapered rollers 57 can roll along the raceways 51, 53.

With such a tapered roller bearing, the raceways 51, 53 have different cone angles, so that the combined force of loads applied to the tapered rollers 57 from the raceways 51, 53 acts in such a direction as to push the tapered rollers 57 toward the large rib surface 54 of the inner ring 56. Thus, during use of the bearing, the tapered rollers 57 are guided with their large end faces 59 pressed against the large rib surface 54, so that the large end faces 59 and the large rib surface 54 are in slide contact with each other.

On the other hand, since the distance between the large rib surface 54 and the small rib surface 55 are designed to be slightly longer than the length of the tapered rollers 57, as shown enlarged in FIG. 11, the small rib surface 55 does not contact the small end faces 60 of the tapered rollers 57 with small clearance existing therebetween. Also, the small rib surface 55 is formed by a surface inclined outwardly relative to the small end faces 60 of the tapered rollers 57. In the bearing manufacturing steps, the small rib surface 55 and the small end faces 60, which are kept out of contact with each other, are not finished by grinding.

In mounting such a tapered roller bearing in a mounting position, as shown in FIG. 12A, the assembly comprising the inner ring 56, the tapered rollers 57 and the retainer 58 is inserted into the raceway 51 of the outer ring 52 from above with the large end faces 59 of the tapered rollers 57 facing up. At this time, since the tapered rollers 57 have freedom relative to the inner ring 56 and the retainer 58, they will not seat in position, and their small end faces 60 are brought into contact with the small rib surface 55. This is an initial assembled state in which clearance δ is present between the large end faces 59 and the large rib surface 54 of the inner ring 56.

Next, the tapered roller bearing in the initial assembled state is temporarily mounted on a mounting position of a mating device. As shown in FIG. 12B, when break-in is carried out at a low speed of about 50–100 rpm while applying an axial load Fa to the end face of the inner ring 56, the tapered rollers 57 will move a distance equal to the gap δ toward the large rib surface 54, until as shown in FIG. 12C, the large end faces 59 come into contact with the large rib surface 54 of the inner ring 56, so that they settle at a regular position during use of the bearing where a gap δ exists between the small end face 60 and the small rib surface 55.

Thereafter, the tapered roller bearing is preloaded axially under a predetermined load. This preloading is carried out to prevent axial movement of the tapered rollers 57 during use of the bearing, and to stably bring the tapered rollers into line contact with the raceways 51, 53 of the outer ring 52 and the inner ring 56. The control of preloading force is carried out by measuring the shaft torque, and preloading ends when the shaft torque reaches a predetermined value.

Since the power transmission device such as a differential has many gear meshing portions and sliding portions of rotary members, foreign matter such as metallic worn powder produced at these portions can enter gear oil sealed in the housing. Such worn powder will penetrate into tapered roller bearings for supporting gear shafts, which are rotating under high load, thus shortening the working life of the tapered roller bearings.

Also, when such tapered roller bearings are used to support gear shafts of a differential which rotates at high speed under high load, since the large end faces of the tapered rollers are brought into sliding contact with the large rib surface of the inner ring, torque due to the slide contact increases. Further, due to frictional heat buildup, the temperature of the bearing portion will rise, thus lowering the viscosity of gear oil. This may cause shortage of oil film.

Further, in mounting the tapered roller bearing on a mounting portion, if the gap between the large end faces 59 of the tapered rollers 57 and the large rib surfaces 54 is large in the initial assembled state shown in FIG. 12A, break-in time tends to be long until the tapered rollers 57 settle in regular position shown in FIG. 12C. As shown in FIG. 11, since the small rib surface 55 of the inner ring 56 is formed inclined outwardly relative to the the small end faces 60 of the tapered rollers 57, variation in the gap between the large end faces 59 and the large rib surface 54 in the initial assembled state is large for the following reasons, and the abovementioned break-in time until all the tapered rollers 57 settle in regular position tends to become further long.

Generally, the small end faces of the tapered rollers remain as forged surfaces, so that chamfer dimensions and shape are large in variation. Variations in chamfer dimension and shape are present not only between tapered rollers but in a circumferential direction of one tapered roller. As shown by solid and chain lines in FIG. 11, if the chamfer dimension and shape of the small end faces 60 differ from each other, the following will result. In the case of the small end faces 60 shown by solid line, in the initial assembled state, point P1 on the small end face 60 comes into contact with point Q1 on the small rib surface 55, so that the gap δ when the tapered rollers 57 settle will be $δ_1$. On the other hand, in the case of the small end face 60 shown by chain line, in the initial assembled state, point P2 comes into contact with point Q2, so that the gap δ when the tapered rollers 57 settle will be $δ_2$. Thus, due to differences in chamfer dimension and shape of the small end faces 60, the time until each tapered roller 57 settles in position tends to vary, so that longer break-in time is required.

An object of this invention is to ensure a long endurance life for a tapered roller bearing and a gear shaft support device for a vehicle.

Another object is to reduce torque loss and heat buildup due to friction.

A further object is to shorten break-in time.

SUMMARY OF THE INVENTION

According to this invention, there is provided a tapered roller bearing comprising an outer ring having a conical raceway, an inner ring having a conical raceway and formed with a large rib surface on the large diameter side of the conical raceway, a plurality of tapered rollers rollably arranged between the raceway of the outer ring and the raceway of the inner ring, and a retainer for keeping the tapered rollers circumferentially spaced a predetermined distance from each other, characterized in that the outer ring, the inner ring and the tapered rollers are all formed from a steel having an oxygen content of 9 ppm or less, and that a carbo-nitrided layer having a carbon content of 0.80 wt % or more and a Rockwell hardness HRC of 58 or more is formed on surfaces of the outer ring, the inner ring and the tapered rollers, and that the retained austenite content of the carbo-nitrided layer is 25 to 35 vol %.

The outer ring, inner ring and tapered rollers are formed from a steel having an oxygen content of 9 ppm or less in order to minimize any nonmetallic inclusions formed by oxides in the steel, improve the mechanical characteristics and fatigue properties, and to sufficiently ensure bearing life under clean lubricating oil. A steel having an oxygen content of 9 ppm or less can be obtained e.g. by a method of degassing molten steel is.

Carbo-nitrided layers are formed on the surfaces of the outer ring, inner ring and tapered rollers for the following reasons. Retained austenite in a carburized layer obtained by normal carburizing has high toughness and work hardening properties. Thus a proper amount of retained austenite ensures hardness of the carburized layer and suppresses initiation and progression of cracks. But it is unstable against heat.

In contrast, if these parts are subjected to carbo-nitriding treatment under suitable conditions, nitrogen atoms will solid soluted in retained austenite, and thus serve to stabilize the retained austenite against heat and also properly keep the properties of the carbo-nitrided layer against a temperature rise due to temperature rize at the bearing portion. In a carbo-nitrided layer obtained by such carbo-nitriding treatment, a greater compressive residual stress is formed, so that it is also possible to further increase fatigue strength.

The retained austenite content should be set at 25–35 vol % to give the carbo-nitrided layer proper toughness, and to relieve excessive increase in stress due to biting of debris. If the retained austenite content is less than 25 vol %, toughness would be insufficient. If over 35 vol %, the hardness would be too low, thus resulting in deterioration in surface roughness due to plastic deformation.

The structure of such a carbo-nitrided layer as mentioned above can be formed by the following treatment steps. After heating and holding the part for a predetermined time period while keeping the carbon potential at 0.8% or over in a carburizing atmosphere, it is quenched in oil and is subjected to hardening. Thereafter it is heated and held for a predetermined time period in ammonia gas for nitriding. It is also possible to employ a method in which nitriding is carried out during carburizing. In order to adjust the retained austenite content, sub-zero treatment or tempering may be carried out.

According to this invention, a carbo-nitrided layer having a carbon content of 0.80 wt % or over and a Rockwell hardness HRC of 58 or over may be formed on the surfaces of the outer ring, inner ring and tapered rollers, the retained austenite amount of this carbo-nitrided layer being 25 to 35 vol %, and crownings may be formed at both ends of the raceway of the inner ring, the width of the crowning at each end being 20% or less of the width of the raceway of the inner ring.

The crowning is formed at each end of the raceway of the inner ring in order to prevent excessive edge loads from acting on the rollers and the raceway of the inner ring. The width of these crownings should be 20% or less of the width of the raceway of the inner ring because if it exceeds 20%, the contact surface pressure at the central portion of the raceway would be excessive.

By forming a crowning having a moderate curvature on a portion of the raceway of the inner ring except both ends at which the crownings are formed, the surface pressure distribution on the raceway can be made more uniform.

According to this invention, the small rib surface of the inner ring may be formed by a surface parallel to the small end faces of the tapered rollers, the value $R/R_{BASE}$ being 0.75 to 0.87, where R is the radius of curvature of the large end faces of the tapered rollers, and $R_{BASE}$ is the distance from the apex of the cone angle of the tapered rollers to the large rib surface of the inner ring.

The small rib surface of the inner ring is formed by a surface parallel to the small end faces of the tapered rollers for the following reasons. As shown enlarged in FIG. 6B, by forming the small rib surface 34 of the inner ring 35 from a surface parallel to the small end faces 39 of the tapered rollers 36, it is possible to minimize the influence of variations in chamfer dimension and shape of the small end faces 39 of the tapered rollers 36 against the gap between the large end faces 38 of the tapered rollers 36 and the large rib surface 33 of the inner ring 35 in the initial assembled state (which is equal to the gap between the small end faces 39 of the tapered rollers 36 and the small rib surfaces 34 of the inner ring 35 when the tapered rollers 36 have settled in position). As shown by chain line in FIG. 6B, even if the chamfer dimensions and shapes of the small end faces 39 differ, in the initial assembled state, since the mutually parallel small end faces 39 and small rib surface 34 are brought into surface contact, the gap between the large end faces 38 and the large rib surface 33 is always constant. Thus it is possible to reduce differences in time required until each tapered roller settles and thus to shorten the break-in time.

The ratio of the radius of curvature R of the large end faces of the tapered rollers to the distance $R_{base}$ from the apex of the cone angle of the tapered rollers to the large rib surface of the inner ring, $R/R_{base}$ should be set at 0.75 to 0.87 for the following reasons.

FIG. 7 shows the results of calculation using the Karna's equation, where t is the thickness of oil film formed between the large rib surface of inner ring and the large end faces of tapered rollers. The ordinate shows the ratio t/to, which is the ratio to oil film thickness to when $R/R_{base}$=0.76. The oil film thickness t is the maximum when $R/R_{base}=0.76$, and decreases sharply when $R/R_{BASE}$ exceeds 0.9.

FIG. 8 shows the results of calculation for determining the maximum hertz stress p between the large rib surface of inner ring and the large end faces of tapered rollers. The ordinate shows, like FIG. 7, the ratio p/po, which is the ratio to maximum hertz stress po when $R/R_{base}=0.76$. The maximum hertz stress p monotonously decreases with an increase in $R/R_{base}$.

In order to reduce torque loss and heat buildup due to slide friction between the large rib surface of inner ring and the large end faces of tapered rollers, it is desirable to increase the oil film thickness t and reduce the maximum hertz stress p. Based on the calculation results of FIGS. 7 and 8 and the below-mentioned seizure resistance test results, the present inventors determined the suitable range of $R/R_{base}$ at 0.75–0.87. For conventional tapered roller bearings, the $R/R_{base}$ value is designed at a range of 0.90–0.97.

By forming the surface roughness Ra of the large rib surface of the inner ring in the range of 0.05–0.20 μm, the oil film thickness t between the large rib surface of inner ring and the large end faces of tapered rollers, and the lubricating condition between these surfaces can be maintained in a proper state.

The surface roughness Ra should be 0.05 μm or over for the following reasons. As shown in FIG. 12B, when the tapered roller bearing is mounted, break-in is carried out at a low speed of 50–100 rpm while applying an axial load Fa to the end face of the inner ring 56. If the surface roughness Ra is less than 0.05 μm, the lubricating state between the large rib surface 54 of the inner ring 56 and the large end faces 59 of the tapered rollers 57 will become mixture of fluid lubrication and boundary lubrication during break-in, so that the friction coefficient varies considerably and the measured shaft torque varies widely. This worsens the preload control accuracy. If Ra is 0.05 μm or over, the lubricating state will be boundary lubrication, so that the friction coefficient stabilizes and thus preload control is possible with high accuracy. Under normal bearing use conditions where speed exceeds 100 rpm, sufficient oil film is formed between the large rib surface 54 and the large end faces 59, so that the lubricating state between these surfaces becomes fluid lubrication, and the friction coefficient decreases.

The surface roughness Ra should be 0.20 μm or under because if Ra is over 0.20 μm, the temperature will rise at the bearing portion in the high-speed rotation region, so that when the viscosity of lubricating oil decreases, the oil film thickness tends to be insufficient and seizure tends to occur.

By restricting the gap δ formed between the small rib surface of the inner ring and the small end faces of the tapered rollers when the large end faces of the tapered rollers are in contact with the large rib surface of the inner ring is not more than 0.4 mm, it is possible to reduce the number of revolutions required for the tapered rollers to settle in position during the break-in, and to shorten the break-in time. The permissible maximum value of the gap δ, that is, 0.4 mm, was determined based on the results of the below-described break-in test.

By forming the small rib surface of the inner ring by grinding or turning, it is possible to accurately control the gap between the small rib surface of the inner ring and the small end faces of the tapered rollers.

The tapered roller bearing of this invention may have the large rib surface of the inner ring made up of a conical surface in contact with the large end faces of the tapered rollers, and a flank smoothly connecting with the conical surface and curving in a direction away from the large end faces of the tapered rollers.

By smoothly connecting the curved flank to the conical surface of the large rib surface of inner ring in contact with the large end faces of the tapered rollers and forming an acute-angle, wedge-shaped gap near the outer edge of the contact region, it is possible to increase the function of drawing lubricating oil into the contact region and to form a good oil film. Also, by the formation of the smooth flank, it is possible to prevent damage due to abutment with the large rib surface of inner ring when the tapered roller skews.

By employing an arc as the sectional shape of the flank, it is possible to easily form a flank that is superior in the lubricating oil drawing function.

By providing a circular recess on the central portion of the large end faces of tapered rollers, and extending the outer peripheral end of the recess to near the boundary between the conical surface and the flank of the large rib surface of inner ring, it is possible to guide lubricating oil to near the wedge-shaped gap and to supply a sufficient amount of lubricating oil into the wedge-shaped gap, and also to further increase the permissible skew angle of the tapered rollers.

By providing the boundary between the conical surface and the flank of the large rib surface of inner ring near the outer edge of the maximum contact oval produced by the contact between the large end faces of the tapered rollers and the large rib surface of the inner ring under the maximum permissible axial load of the tapered roller bearing, it is possible to suitably form the wedge-shaped gap for drawing the lubricating oil in the entire load range of the tapered roller bearing.

Also, in this invention, in a gear shaft support device for a vehicle in which a gear shaft is rotatably supported by a tapered roller bearing in a housing in which is sealed gear oil, the outer ring, inner ring and tapered rollers of the tapered rollers are formed from a steel having an oxygen content of 9 ppm or less, a carbo-nitrided layer having a carbon content of 0.80 wt % or more and a Rockwell hardness HRC of 58 or more is formed on each of their surfaces, the carbo-nitrided layer having a retained austenite amount of 25 to 35 vol %. Thus it is possible to markedly prolong the maintenance cycle of differentials and transmissions, etc.

Other features and objects of the present invention will become apparent from the following description made with reference to the accompanying drawings, in which:

DETAILED DESCRIPTION OF THE PREFERRED EMBODIMENT

Figure 1:
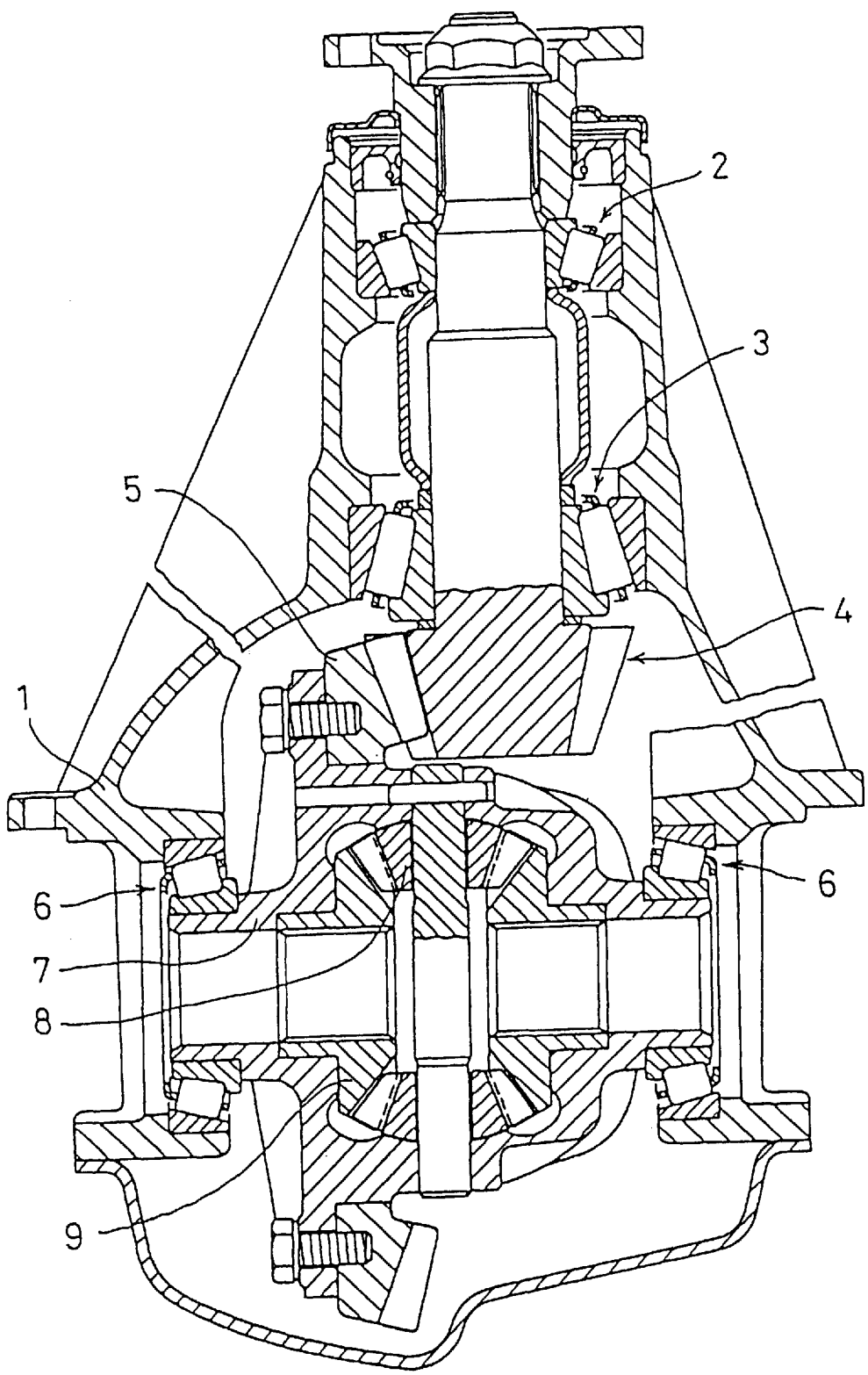
FIG. 1 is a vertical sectional view of a differential in which is assembled a gear shaft support device of a first embodiment.
Figure 9:
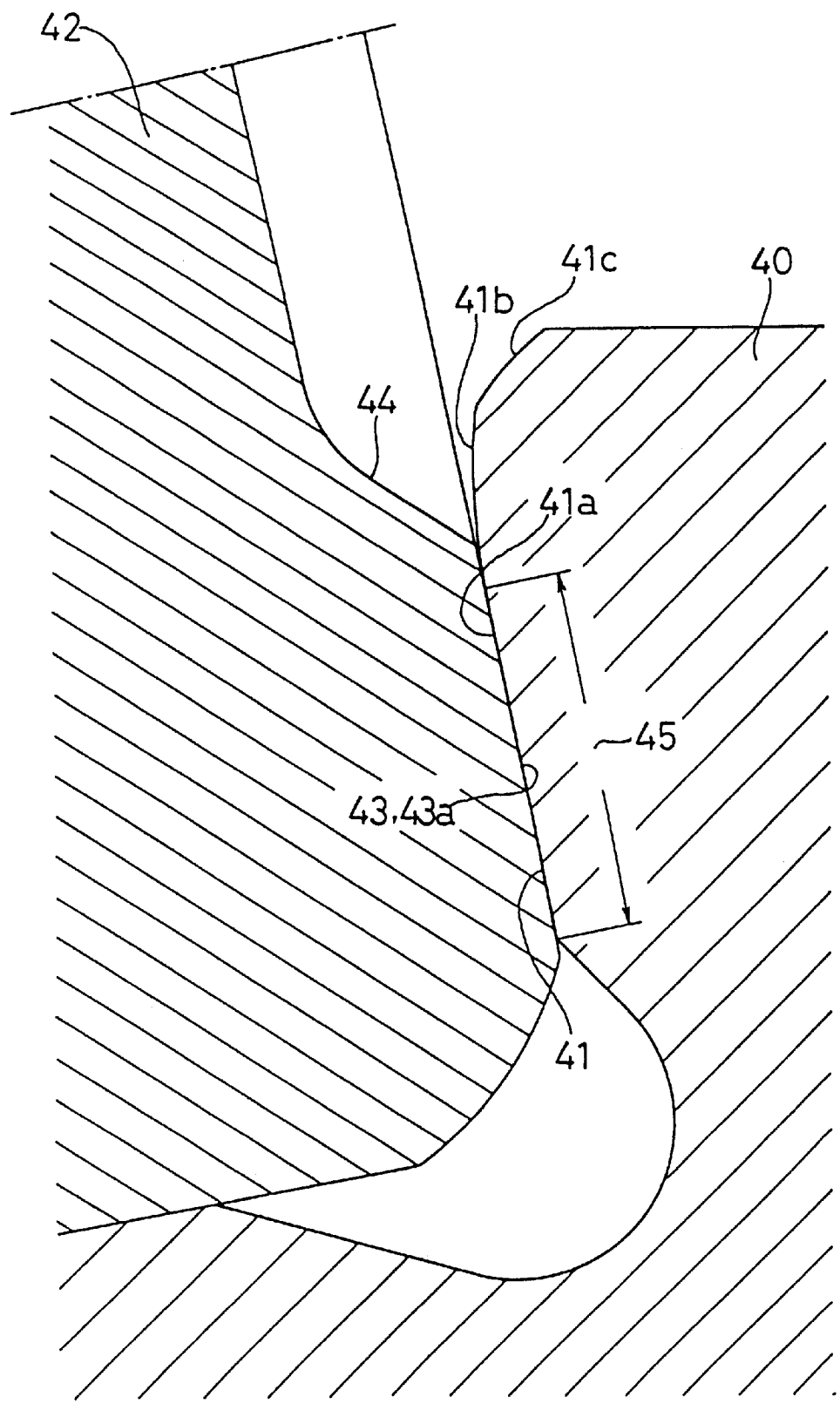
FIG. 9 is a partially enlarged sectional view of a tapered roller bearing of a fifth embodiment.
Figure 10:
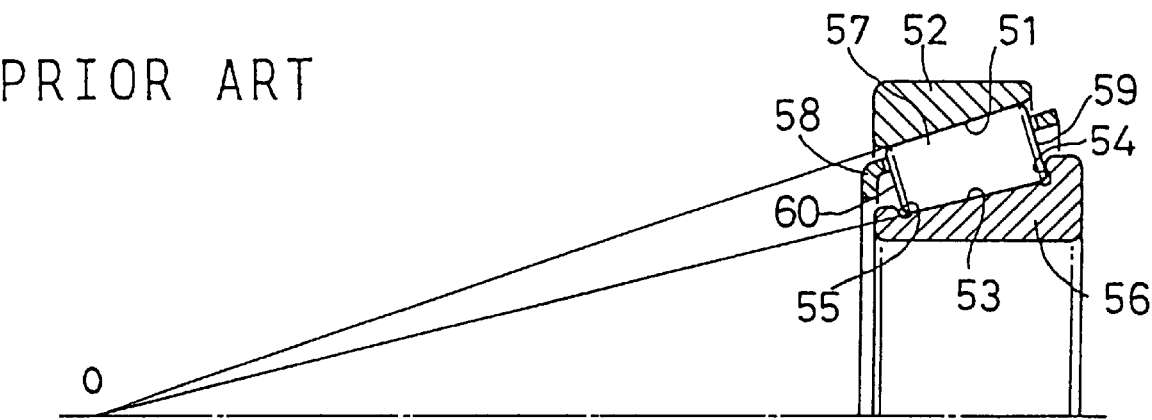
FIG. 10 is a partially omitted vertical sectional view of a conventional tapered roller bearing.
Figure 11:
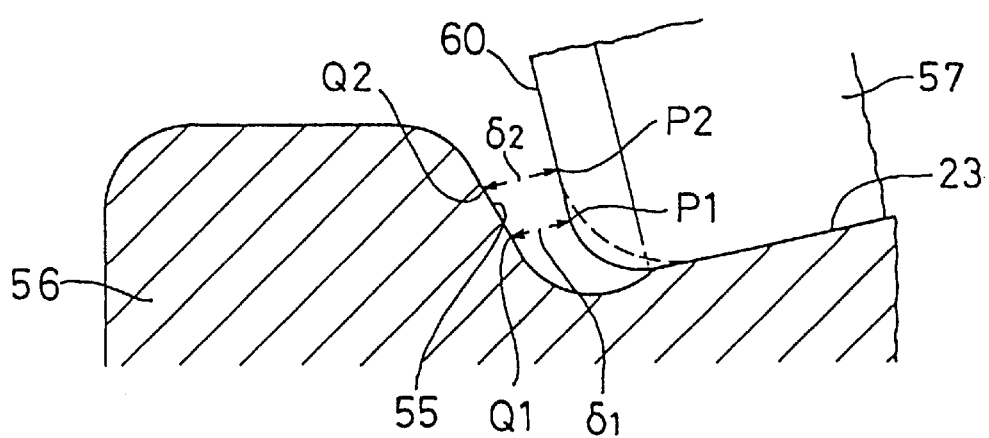
FIG. 11 is a partially enlarged sectional view of FIG. 10.
Figure 12A:
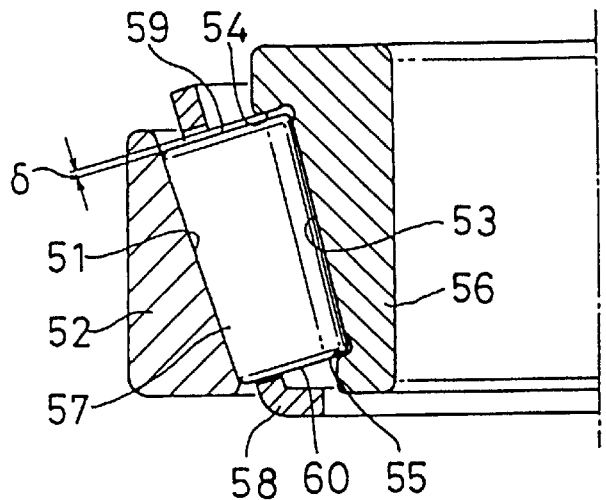
FIGS. 12A–12C are sectional views showing how the tapered roller bearing is mounted.
Figure 12B:
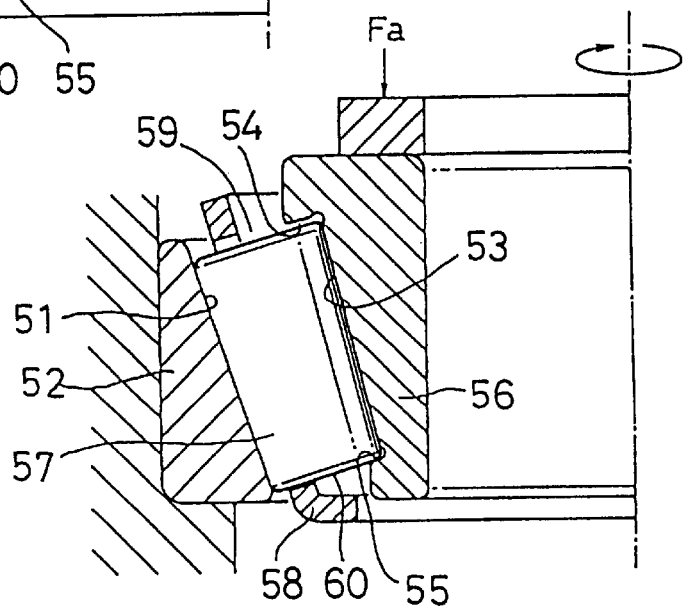
Figure 12C:
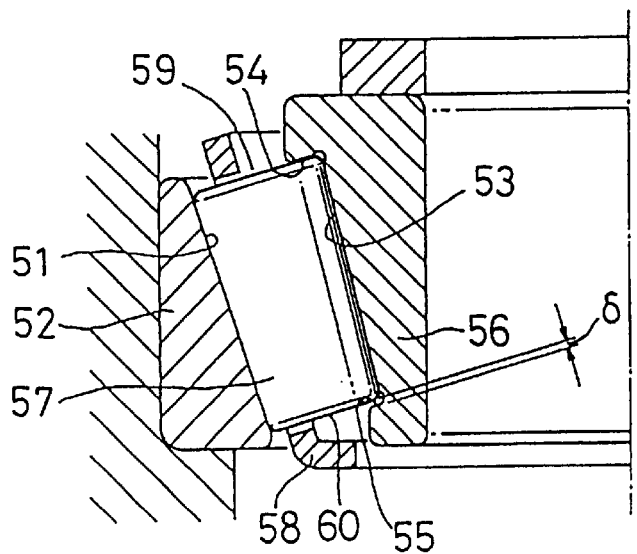

With reference to FIGS. 1 and 9, embodiments of this invention are described. FIG. 1 shows, as described above, a differential of an automobile, in which for the support of the drive pinion 4 and the differential gear case 7 on which is mounted the ring gear 5, the gear shaft support device using the tapered roller bearings 2, 3, 6 of the embodiments is adopted.

Figure 2A:
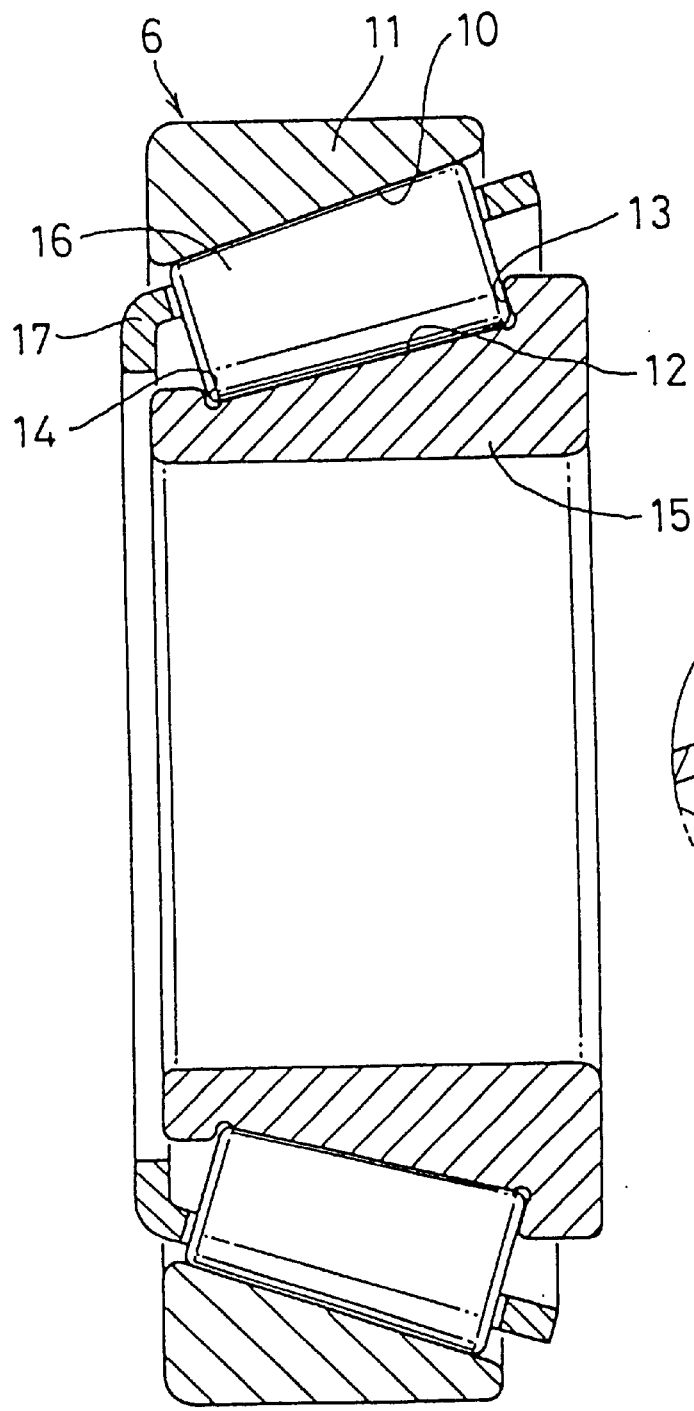
FIG. 2A is a vertical sectional view of a tapered roller bearing of a first embodiment.

FIG. 2A shows a tapered roller bearing 6 as a typical example. It has an outer ring 11 having a conical raceway 10, an inner ring 15 having a conical raceway 12, a large rib surface 13 on the large-diameter side of the raceway 12, and a small rib surface 14 on its small-diameter side, a plurality of tapered rollers 16 rollably arranged between the respective raceways 10, 12 of the outer ring 11 and the inner ring 15, and a retainer 17 for retaining the tapered rollers 16 at predetermined circumferential intervals.

Figure 2B:
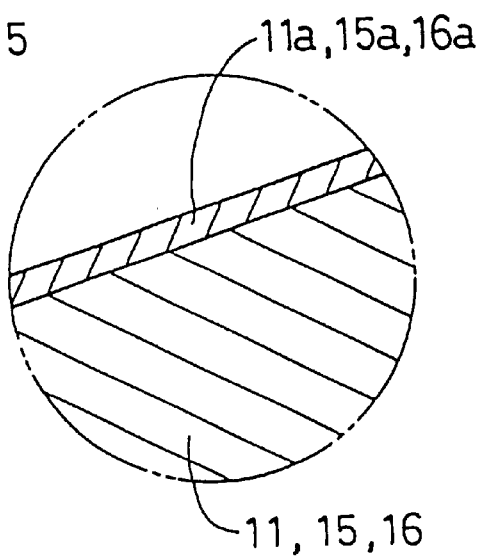
FIG. 2B is a partially enlarged sectional view of the same.

The outer ring 11, inner ring 15 and tapered rollers 16 are all formed from carburized be ring steel (SCr 435) having an oxygen content of 9 ppm or less, and as shown in FIG. 2B, carbo-nitrided layers 11a, 15a, 16a having a carbon content of 0.80 wt % or more and a Rockwell hardness HRC of 58 or more, and the retained austenite content of 25 to 35 vol % are formed on the surfaces of these parts 11, 15 and 16. Though not shown, the tapered roller bearings 2, 3 have the same structure.

Hereinbelow, the Examples of the first embodiment and its Comparative Examples are described.

EXAMPLES

Tapered roller bearings (Examples 11–15 in Table 1) in which a carbo-nitrided layer having a carbon content of 0.80 wt % or more and a Rockwell hardness HRC of 58 or more and the retained austenite content of 25–35 vol % was formed on each of the outer ring, inner ring and tapered rollers formed from carburized bearing steel (SCr435) having an oxygen content of 9 ppm or less were prepared. The bearing dimensions were all 40 mm in inner diameter and 68 mm in outer diameter.

Comparative Examples

Tapered roller bearings (Comparative Examples 11–15 in Table 1) in which, similar to the Examples, a carbo-nitrided layer having a carbon content of 0.80 wt % or over and a Rockwell hardness HRC of 58 or over and the retained austenite content of 25–35 vol % was formed on each of the outer ring, inner ring and tapered rollers formed from carburized bearing steel (SCr435) having an oxygen content exceeding 9 ppm, and tapered roller bearings (Comparative Examples 16, 17 in Table 1) in which the outer ring, inner ring and tapered rollers were formed from carburized bearing steel (SCr435) having an oxygen content of 9 ppm or less but the carbo-nitrided layer formed thereon had a retained austenite content outside the range as claimed in the present invention were prepared. Also, a tapered roller bearing (Comparative Example 18 in Table 1) in which carburized bearing steel (SCr435) having an oxygen content exceeding 9 ppm was used and heat treatment was only ordinary carburizing was prepared. The dimensions of each bearing were the same as in Examples of the invention.

A debris contamination life test in which the tapered roller bearings of the Examples of he invention and Comparative Examples were mounted on a rotary shaft arranged in a case in which was sealed a lubricating oil in which was mixed debris, and a clean oil life test in which they were mounted on a rotary shaft arranged in a case in which clean lubricating oil was circulated were conducted.

The test conditions are as shown below.
(Debris Contamination Life Test)
   Load: 11.76 kN
   Revolutional speed: 1500 rpm
   Lubricating oil: turbine oil VG56 (oil bath)
   Debris: gas atomized metallic powder (particle diameter: 100–180 μm, hardness: HV 700–800, mixed amount: 1 g/liter)
(Clean Oil Life Test)
   Load: 21.56 kN
   Revolutional speed: 2000 rpm
   Lubricating oil: turbine oil VG 56 (circulation oil supply)

The test results are shown in Table 1. In the debris contamination life test and the clean oil life test, the lives were evaluated in terms of L10 life (time period during which 90% of the bearings were not destroyed and usable). Also, for the life ratios, the endurance life of Comparative Example 18, which were manufactured under ordinary conditions both in material and heat treatment, was used as a reference value.

It is apparent that the tapered roller bearings of Examples show excellent results both in the debris contamination life test and clean oil life test. On the other hand, Comparative Examples 11–15, in which the retained austenite content was in the range of 25–35 vol % but the oxygen content of the steel was high, showed good results in the debris contamination life test, but inferior results in the clean oil life test. Also, for Comparative Examples 16–17, in which the retained austenite content was out of the range of the present application, the endurance life in the clean oil life test was a relatively high value, but that of the debris contamination life test was inferior.

Figure 3:
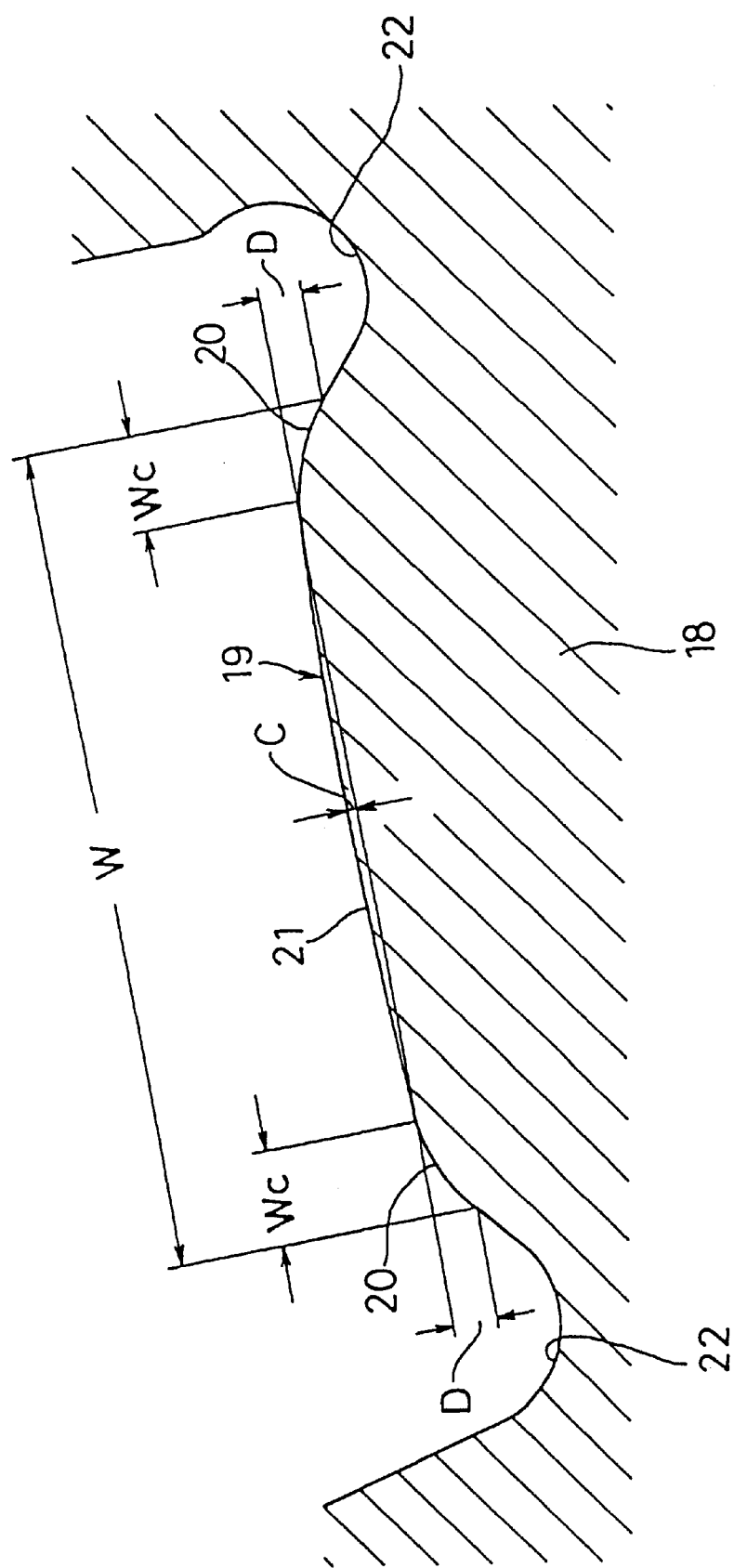
FIG. 3 is a partially enlarged sectional view of a tapered roller bearing of a second embodiment.

FIG. 3 shows in enlarged scale a portion of the tapered roller bearing of the second embodiment. It has edge crownings 20 having a width Wc which is 20% or less of the width W of the raceway 19, at both ends of the raceway 19 of the inner ring 18. At the central portion between these respective crownings 20, a center crowning having an extremely moderate curvature is formed. The drop amount D of the crownings 20 is 20 μm, and outside the crownings 20, recesses 22 are provided.

This tapered roller bearing, too, is used to support a differential gear case 7 like the one shown in FIG. 1, and each part is formed from carburized bearing steel (SCr 435), and like the tapered roller bearing 6 shown in FIG. 2, carbo-nitrided layers having a carbon content of 0.8 wt % or over and a Rockwell hardness HRC of 58 or over, and the retained austenite content of 25–35 vol %, are formed on their surfaces.

Hereinbelow, the Examples of the second embodiment and its Comparative Example are described.

EXAMPLES

Tapered roller bearings (Examples 21–25 in Table 2) in which a carbo-nitrided layer having a carbon content of 0.80 wt % or over, a Rockwell hardness HRC of 58 or over and a retained austenite content of 25–35 vol % was formed on each of the outer ring, inner ring and tapered rollers formed from carburized bearing steel (SCr435), and edge crownings having a width Wc which was 20% or less of the width W of the inner ring raceway were formed at both ends of the raceway were prepared. The tapered roller bearings of Examples 21 through 23 were formed with a center crowning having a crowning amount C of 2 μm at the center of the inner ring raceway, while the tapered roller bearings of Examples 24 and 25 were not. The bearing dimensions are the same as in the first embodiment.

Comparative Examples

Tapered roller bearings (Comparative Examples 21–24 in Table 2) in which, similar to the Examples, a carbo-nitrided layer having a carbon content of 0.80 wt % or over and a Rockwell hardness HRC of 58 or over was formed on each of the outer ring, inner ring and tapered rollers formed from carburized bearing steel (SCr435), but the retained austenite content in the carbo-nitrided layers was out of the range as claimed in the present application, and tapered roller bearings (Comparative Examples 25–27 in Table 2) in which the retained austenite content was within the range of the present application, but the width of edge crownings exceeded the range of the present application, or full crowning was formed over the entire width of the inner ring raceway were prepared. In Comparative Examples 22 and 24, the width of edge crowning also exceeded the range of the present application. Also, a tapered roller bearing (Comparative Example 28 in Table 2) in which the retained austenite content and the width of edge crowning were within the range of the present application, and the heat treatment was ordinary carburizing hardening was prepared. Dimensions of each bearing were the same as in the Examples.

For the tapered roller bearings of the Examples and Comparative Examples, a debris contamination life test was conducted. The test conditions were the same as those in the first embodiment, and the endurance life was evaluated in terms of L10 life.

The test results are shown in Table 2. For the life ratios in the table, the endurance life of Comparative Example 28, in which the heat treatment was only carburizing hardening, was used as a reference value. For any of the articles so indicated in the Table, seizure occurred at the central portion of the raceway.

For any of the tapered roller bearings of the Examples, the life ratios was more than four-fold and showed an excellent endurance life. Also, no seizure occurred at the central portion of the raceway. On the other hand, Comparative Examples 21–24, in which the retained austenite content was out of the range of the present application, had only about half the life ratio of the tapered roller bearings of the Examples. For Comparative Examples 22 and 24, which were large in crowning width, seizure occurred at the central portion of the raceway. Also, for Comparative Examples 25 and 26, in which the retained austenite content was in the range of the present application, but the crowning width was large, the life ratio was good, but seizure occurred at the central part of the raceway. For Comparative Example 27, which was extremely small in drop amount D, peeling occurred at the ends of the raceway, and the life ratio improved little.

Figure 4A:
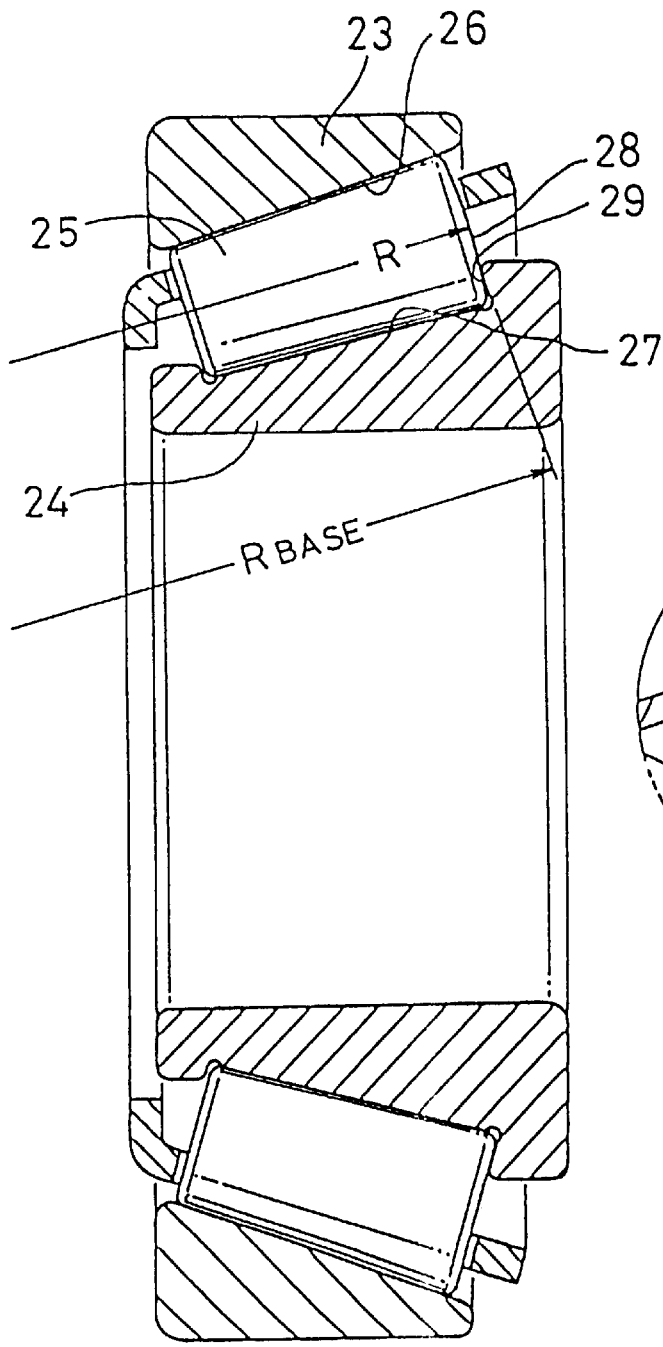
FIG. 4A is a vertical sectional view of a tapered roller bearing of a third embodiment.
Figure 4B:
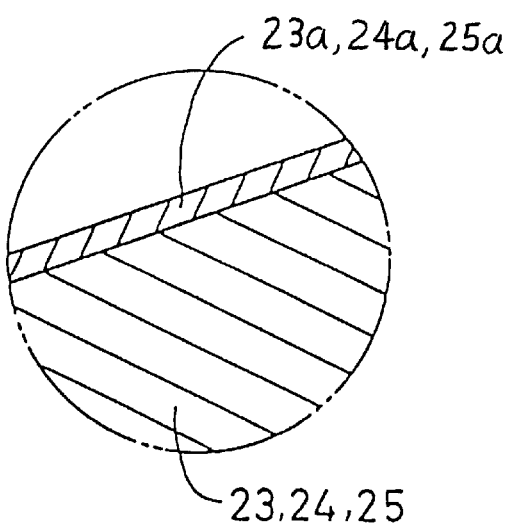
FIG. 4B is a partially enlarged sectional view of the same.

FIGS. 4A, 4B show the third embodiment. This tapered roller bearing was also used for the support of a differential gear case 7 like the one shown in FIG. 1, and their parts, that is, the outer ring 23, inner ring 24 and tapered rollers 25, were formed from carburized bearing steel (SCr435), and carbo-nitrided layers 23a, 24a, 25a having a carbon content of 0.80 wt % or over and a Rockwell hardness HRC of 58 or over were formed on the surfaces of these parts as shown in FIG. 4B.

Figure 5:
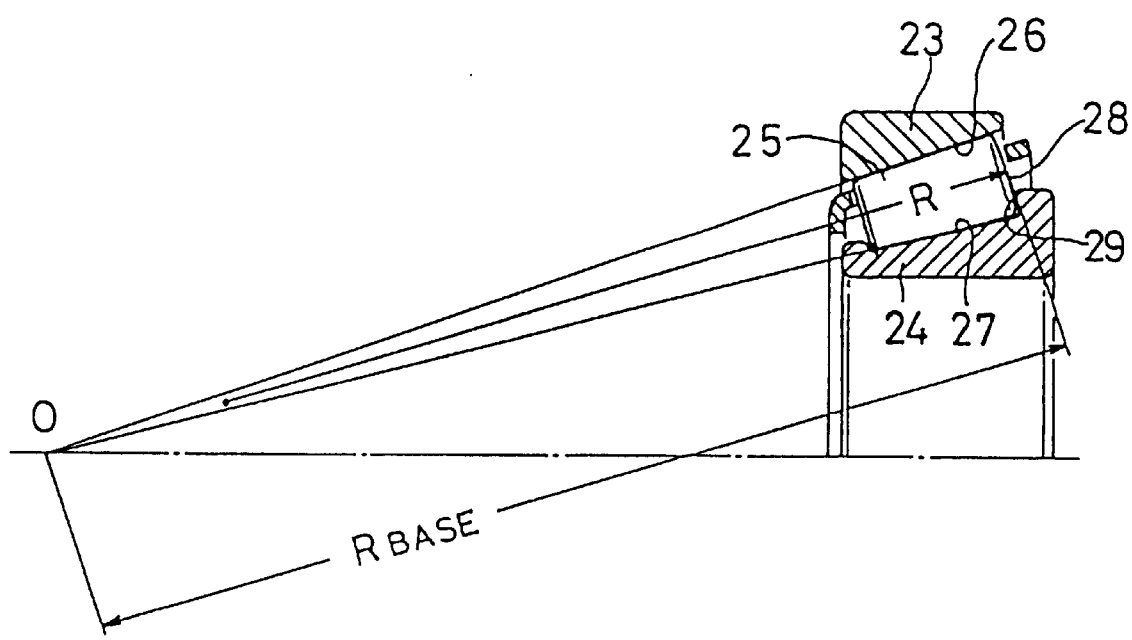
FIG. 5 is a sectional view explaining the design specifications of the tapered roller bearing of FIG. 4.

As shown in FIG. 5, the cone angle apex of the tapered rollers 25, and the respective raceways 26, 27 of the outer ring 23 and inner ring 24 converge at one point on the centerline of the tapered roller bearing, and it is manufactured such that the ratio of the radius of curvature R of the large end faces 28 of the tapered rollers 25 to the distance $R_{base}$ from point O to the large rib surface 29 of the inner ring 24, i.e. $R/R_{base}$, is in the range of 0.75–0.87. Also, the large rib surface 29 is ground to the surface roughness Ra of 0.12 μm.

Hereinbelow, the Examples of the third embodiment and its Comparative Example are described.

EXAMPLES

Tapered bearings (Examples 31–34 in Table 3) shown in FIGS. 4 and 5, were prepared in which a carbo-nitrided layer having a carbon content of 0.8 wt % or over and a Rockwell hardness HRC of 58 or over was formed on the surface of each of the outer ring, inner ring and tapered rollers, which were formed from carburized bearing steel SCr435, in which the radius of curvature R of the large end faces of the tapered rollers was in the range of $R/R_{base}$=0.75 to 0.87, and in which the surface roughness Ra of the large rib surface of the inner ring was 0.12 μm. Dimensions of the bearings were the same as in the first and second embodiments.

Comparative Examples

Tapered bearings (Comparative Examples 31–33 in Table 3) were prepared in which, like the Examples, a carbo-nitrided layer having a carbon content of 0.8 wt % or over and a Rockwell hardness HRC of 58 or over was formed on the surface of each of the outer ring, inner ring and tapered rollers which were formed from carburized bearing steel SCr435, but the $R/R_{base}$ ratio was out of the range of the present application, and a tapered roller bearing (Comparative Example 34 in Table 4) in which the heat treatment was only carburized and hardening, and the $R/R_{base}$ ratio was also out of the range of the present application was prepared. Dimensions of the bearings are the same as in Examples.

For the Examples and Comparative Examples, a seizure resistance test using a rotary tester, and the same debris contamination life test as in the first and second embodiments were conducted.

The test conditions of the seizure resistance test were as follows.

Load: 19.61 kN

Revolutional speed: 1000–3500 rpm

Lubricating oil: turbine oil VG 56 (oil supply rate: 40 mililiters/minute, oil temperature: 40° C.±3° C.)

The test results are shown in Table 3. For the life ratios in the debris contamination life test, the endurance life (L10 life) of Comparative Example 34 was used as a reference value. Also, seizure in the seizure resistance test occurred between the large rib surface of the inner ring and the large end faces of the tapered rollers.

For any of the tapered roller bearings of Examples, the endurance life was good with the life ratio in the debris contamination life test being four or more. Also, it is apparent that the limit revolving speed at which seizure occurred in the seizure resistance test was 2700 rpm or over. On the other hand, for Comparative Examples 31–33, in which carbo-nitrided layers were formed, but the $R/R_{base}$ ratio was out of the range of the present application, although the life ratio was good, the limit revolving speed for the occurrence of seizure was 2500 rpm or under, and the possibility that seizure may occur under normal use conditions such as in a differential was high. For Comparative Example 33, in which the surface roughness Ra of the large rib surface was rough, it showed a limit revolving speed that was lower than in Comparative Example 32 having the same radius of curvature. For Comparative Example 34, in which heat treatment was ordinary carburizing, and also $R/R_{base}$ ratio was a conventional value, any of the test results were inferior.

In the above embodiments, SCr435 was used as a material for each part, but it is possible to use such bearing steels as SCM420, SCM430, SCM435, SCr420, SCr430, SAE5130, and SAE8620.

Figure 6A:
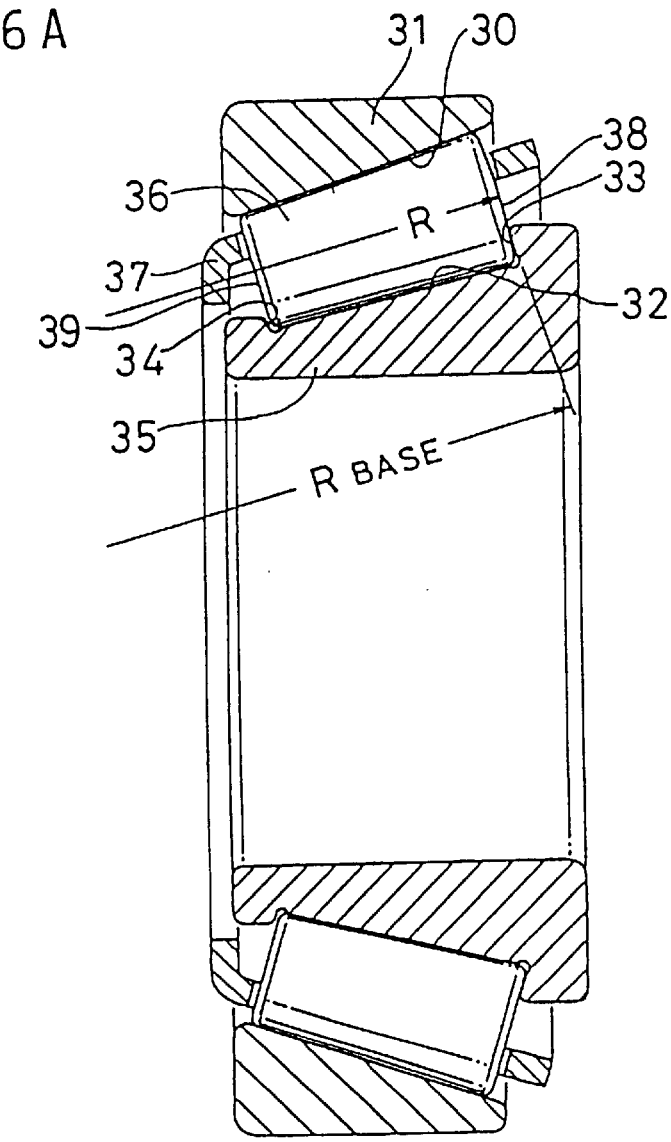
FIG. 6A is a vertical sectional view of a tapered roller bearing of a fourth embodiment.
Figure 6B:
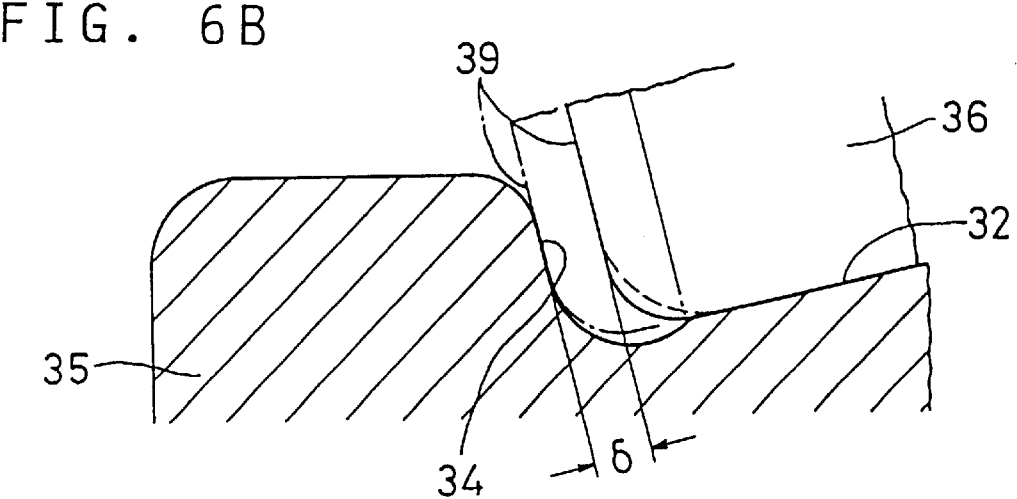
FIG. 6B is a partially enlarged sectional view of the same.
Figure 7:
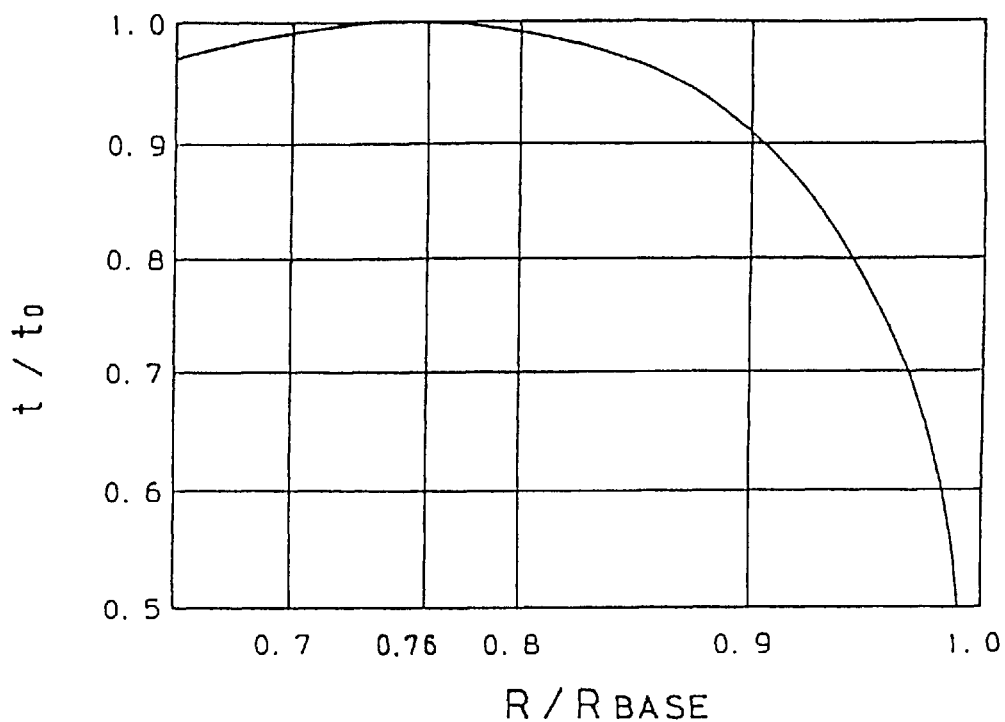
FIG. 7 is a graph showing the relation between the radius of curvature of the large end face of tapered roller and the oil film thickness.
Figure 8:
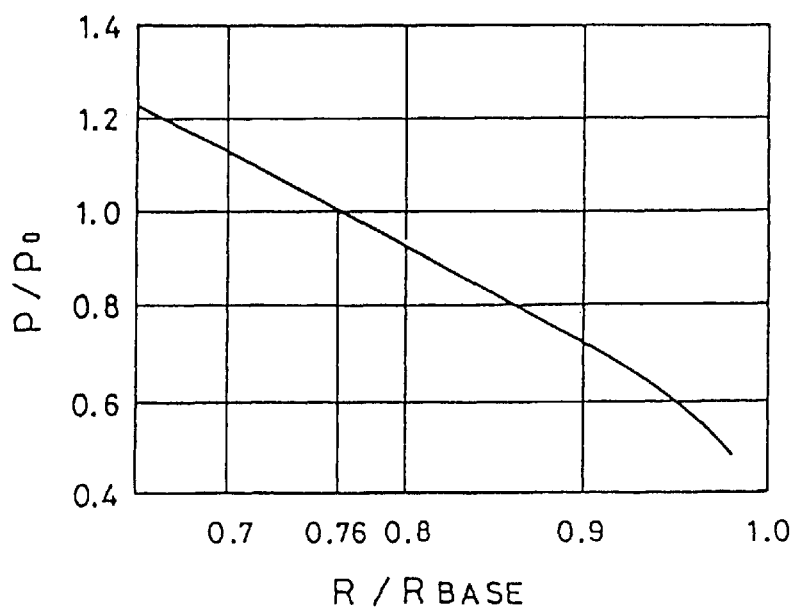
FIG. 8 is a graph showing the relation between the radius of curvature of the large end face of tapered roller and the maximum hertz stress.

FIGS. 6A, 6B show the fourth embodiment. This tapered roller bearing is also used for the support of a differential gear case 7 as in FIG. 1, and comprises an outer ring 31 having a conical raceway 30, an inner ring 35 having a conical raceway 32 and provided with a large rib surface 33 on the large-diameter side of the raceway 32 and a small rib surface 34 on its small-diameter side, a plurality of tapered rollers 36 arranged between the respective raceways 30, 32 of the outer ring 31 and the inner ring 35, and a retainer 37 retaining the tapered rollers 36 at predetermined circumferential intervals.

The small rib surface 34 of the inner ring 35 is, as shown enlarged in FIG. 6B, is finished to a ground surface parallel to the small end faces 39 of the tapered rollers 36 arranged on the raceway 32. It is in surface contact with the small end faces 39 of the tapered rollers 36 in the initial assembled state shown by one-dot chain line in FIG. 6B, and the gap δ with respect to the small end faces 39 of the tapered rollers 36 in the state in which the tapered rollers 36 have settled in position as shown by solid line is in the range of not more than 0.4 mm. The small rib surface 34 may be finished by turning to reduce the cost.

The cone angle apexes of the tapered rollers 36, and the respective raceways 30, 32 of the outer ring 31 and inner ring 35 converge, like the third embodiment shown in FIG. 5, at one point O on the centerline of the tapered roller bearing, and it is manufactured such that the ratio of the radius of curvature R of the large end faces 38 of the tapered rollers 36 to the distance $R_{BASE}$ from point O to the large rib surface 33 of the inner ring 35, i.e. $R/R_{base}$, is in the range of 0.75–0.87. Also, the large rib surface 33 is ground to the surface roughness Ra of 0.12 μm.

The Examples of the fourth embodiment and its Comparative Examples are described below.

EXAMPLES

Tapered roller bearings (Examples 41–44 in Table 4) were prepared in which the radius of curvature R of the large end faces of the tapered rollers was such that the ratio $R/R_{base}$ be 0.75–0.87, the surface roughness Ra of the large rib surface of the inner ring was 0.12 μm, its small rib surface was formed as a ground surface parallel to the small end faces of the tapered rollers, and the gap δ was in the range of not more than 0.4 mm. Bearing dimensions were the same as in each of the abovementioned embodiments.

Comparative Examples

Tapered roller bearings (Comparative Examples 41–43 in Table 4) were prepared in which the $R/R_{base}$ value was out of the range of the present application, the small rib surface of the inner ring was inclined outwardly relative to the small end faces of the tapered rollers, and the gap δ exceeded 0.4 mm.

For the tapered roller bearings of the Examples and Comparative Examples, a seizure resistance test was conducted under the same conditions as in the third embodiment. Also, for the tapered roller bearings of Example 42 and Comparative Example 42, break-in test was also conducted. Sample numbers for the break-in test was 66 for Example 42 and 10 for Comparative Example 42.

The results of test are shown in Table 4. Seizure in the seizure resistance test occurred between the large rib surface of the inner ring and the large end faces of the tapered rollers.

For any of the tapered roller bearings of Examples, the limit revolving speed in the seizure resistance test was 2700 rpm or over. This shows that the frictional resistance between the large rib surface of inner ring and the large end faces of tapered rollers is small. On the other hand, for the tapered roller bearings of Comparative Examples, the seizure occurrence limit revolving speed was 2500 rpm or under, and a problem may arise under normal use conditions such as in a differential. For Comparative Example 43, in which the surface roughness Ra of the large rib surface was rough, it showed a lower seizure occurrence limit revolving speed than in Comparative Example 42 having the same radius of curvature R.

For the break-in test results, in Comparative Examples, the average value of the number of revolutions until the tapered rollers settle in position was six, whereas in Examples, this value was about half, i.e. 2.96. In Examples of the invention, the standard deviation of variation in the number of revolutions was also small. Thus, this shows that it is possible to stably shorten the break-in time.

FIG. 9 shows a portion of the tapered roller bearing of the fifth embodiment. This tapered roller bearing was also used for the support of a differential gear case 7 as shown in FIG. 1. The large rib surface 41 of the inner ring 40 comprises a conical surface 41a, and a flank 41b smoothly connecting with the conical surface 41 and having an arcuate section, and a chamfer 41c connecting with the flank 41b. The conical surface 41a is, like the tapered roller bearing shown in FIG. 5, formed with point O as its center. The end faces 43 of the tapered rollers 42 are formed as a spherical surface 43a having a radius of curvature R that is smaller than the distance Ro from point O to the large rib surface 41 of the inner ring 40. A recess 44 of a circular shape is formed at the center of the spherical surface 43a. The outer peripheral end of the recess 44 extends to near the boundary between the conical surface 41a and the flank 41b of the large rib surface 41.

As mentioned above, during use of the bearing, the tapered rollers 42 roll with their large end faces 43 pressed against the large rib surface 41, and the spherical surface 43a is partially brought into contact with the conical surface 41a, so that a contact oval 45 is produced between these two curved surfaces. The boundary between the flank 41b and the conical surface 41a is provided near the outer edge of the contact oval 45, and an acute wedge-shaped gap is defined by the flank 41b and the spherical surface 43a at a position near the contact oval 45.

The contact oval 45 grows larger as the axial load during use of the bearing increases. With this tapered roller bearing, assuming the maximum contact oval under the permissible maximum axial load, the boundary between the flank 41b and the conical surface 41a is designed to be near the outer edge of the maximum contact oval, so that wedge-shaped gap for drawing the lubricating oil will be formed over the entire load range.

The present invention is applicable to various types of tapered roller bearings.

As described above, for the tapered roller bearing of this invention, each of its parts, i.e. outer ring, inner ring and tapered rollers are formed from steel having an oxygen content of 9 ppm or less, and a carbo-nitrided layer having a carbon content not less than 0.80 wt % and a Rockwell hardness HRC of 58 or over and the retained austenite content of 25–35 vol % is formed on the surface of these parts. Thus it is possible to enhance the mechanical properties and fatigue strength of the parts, stably maintain the carbo-nitrided layers on the surfaces of the parts to a quality having suitable toughness, and to markedly improve the endurance life in debris contamination condition.

According to this invention, an edge crowning having a width that is 20% or less of the width of the raceway is formed at both ends of the inner ring raceway. This prevents seizure by making the contact surface pressure at the raceway uniform, maintains the carbo-nitrided layers on the surfaces of the parts stably to a quality having suitable toughness, and to markedly improve the endurance life in debris contamination condition.

According to this invention, the radius of curvature R of the large end faces of the tapered rollers is such that the ratio $R/R_{base}$ will be 0.75–0.87, and the small rib surface of the inner ring is formed into a surface parallel to the small end faces of the tapered rollers to prevent seizure by reducing torque loss and heat buildup due to slide friction between the large rib surface of the inner ring and the end faces of the tapered rollers, and to shorten the break-in time to improve efficiency of mounting of the bearing.

Further, according to this invention, a curved flank is smoothly connected to the conical surface of the large rib surface of the inner ring in contact with the large end faces of the tapered rollers to form an acute wedge-shaped gap to increase the lubricating oil drawing function into this contact region, prevent seizure by reducing torque loss and heat buildup due to the slide friction, and to prevent seizure due to abutment with the large rib surface of the inner ring during tapered roller skew.

With the gear shaft support device of this invention, since its gear shaft is supported by the tapered roller bearing of this invention, endurance life improves even under use conditions in which foreign matter mixes into gear oil, so that it is possible to extremely prolong the maintenance cycle of a power transmission device such as a differential.

TABLE 1

| Specimen | Oxygen content (ppm) | Heat treatment | Retained austenite content (%) | Debris Contamination life test Life (hr) | Debris Contamination life test Life ratio | Clean oil life test Life (hr) | Clean oil life test Life ratio |
|---|---|---|---|---|---|---|---|
| Example 11 | 8 | Carbo-nitriding | 25 | 122 | 4.4 | 1223 | 2.9 |
| Example 12 | 8 | Carbo-nitriding | 27 | 150 | 5.4 | 1242 | 2.9 |
| Example 13 | 9 | Carbo-nitriding | 31 | 159 | 5.7 | 1360 | 3.2 |
| Example 14 | 7 | Carbo-nitriding | 32 | 155 | 5.5 | 1285 | 3.0 |
| Example 15 | 8 | Carbo-nitriding | 35 | 135 | 4.8 | 1390 | 3.3 |
| Comparative example 11 | 12 | Carbo-nitriding | 25 | 126 | 4.5 | 855 | 2.0 |
| Comparative example 12 | 14 | Carbo-nitriding | 28 | 140 | 5.2 | 895 | 2.1 |
| Comparative example 13 | 14 | Carbo-nitriding | 30 | 154 | 5.5 | 905 | 2.1 |
| Comparative example 14 | 15 | Carbo-nitriding | 32 | 140 | 5.0 | 798 | 1.9 |
| Comparative example 15 | 13 | Carbo-nitriding | 35 | 120 | 4.3 | 962 | 2.3 |
| Comparative example 16 | 8 | Carbo-nitriding | 40 | 86 | 3.1 | 1120 | 2.6 |
| Comparative example 17 | 8 | Carbo-nitriding | 20 | 74 | 2.6 | 990 | 2.3 |
| Comparative example 18 | 14 | Carburizing | 28 | 28 | 1.0 | 425 | 1.0 |

TABLE 2

| Specimen | Heat treatment | Retained austenite content (%) | Crowning width $W_c/W$ (%) | Drop amount D (m) | Life ratio | Seizure |
|---|---|---|---|---|---|---|
| Example 21 | Carbo-nitriding | 25 | 10 | 20 | 4.0 | Nil |
| Example 22 | Carbo-nitriding | 27 | 14 | 20 | 4.9 | Nil |
| Example 23 | Carbo-nitriding | 31 | 12 | 20 | 5.2 | Nil |
| Example 24 | Carbo-nitriding | 32 | 15 | 20 | 5.0 | Nil |
| Example 25 | Carbo-nitriding | 35 | 9 | 20 | 4.4 | Nil |
| Comparative example 21 | Carbo-nitriding | 20 | 15 | 20 | 2.3 | Nil |
| Comparative example 22 | Carbo-nitriding | 22 | 25 | 20 | 2.8 | Occured |
| Comparative example 23 | Carbo-nitriding | 40 | 15 | 20 | 2.7 | Nil |
| Comparative example 24 | Carbo-nitriding | 46 | 22 | 20 | 2.3 | Occured |
| Comparative example 25 | Carbo-nitriding | 30 | 25 | 20 | 3.2 | Occured |
| Comparative example 26 | Carbo-nitriding | 30 | Full crownig | 20 | 4.7 | Occured |
| Comparative example 27 | Carbo-nitriding | 30 | Full crowning | 3 | 1.4 | Nil |
| Comparative example 28 | Carburizing | 28 | 13 | 20 | 1.0 | Occured |

TABLE 3

| Specimen | Heat treatment | Radius of curvature R/R$_{BASE}$ (-) | Surface roughness R$_a$ (m) | Debris Contamination life test Life (hr) | Debris Contamination life test Life ratio | Limit revolving speed for seizure occurrence (rpm) |
|---|---|---|---|---|---|---|
| Example 31 | Carbo-nitriding | 0.75 | 0.12 | 150 | 5.4 | 2700 |
| Example 32 | Carbo-nitriding | 0.80 | 0.12 | 159 | 5.7 | 3500 |
| Example 33 | Carbo-nitriding | 0.85 | 0.12 | 155 | 5.5 | 3000 |
| Example 34 | Carbo-nitriding | 0.87 | 0.12 | 135 | 4.8 | 2700 |
| Comparative example 31 | Carbo-nitriding | 0.70 | 0.12 | 154 | 5.5 | 2200 |
| Comparative example 32 | Carbo-nitriding | 0.94 | 0.12 | 140 | 5.0 | 2500 |
| Comparative example 33 | Carbo-nitriding | 0.94 | 0.25 | 122 | 4.4 | 2200 |
| Comparative example 34 | Carburizing | 0.94 | 0.25 | 28 | 1.0 | 2000 |

TABLE 4

| Specimen | Radius of curvature R/R$_{BASE}$ (-) | Surface roughness R$_a$ (μm) | Limit revolving speed for seizure occurrence (rpm) | Number of revolutions in break-in test Average value | Number of revolutions in break-in test Standard deviation |
|---|---|---|---|---|---|
| Example 41 | 0.75 | 0.12 | 2700 | — | — |
| Example 42 | 0.80 | 0.12 | 3500 | 2.96 | 0.56 |
| Example 43 | 0.85 | 0.12 | 3000 | — | — |
| Example 44 | 0.87 | 0.12 | 2700 | — | — |
| Comparative example 41 | 0.70 | 0.12 | 2200 | — | — |
| Comparative example 42 | 0.94 | 0.12 | 2500 | 6.00 | 1.33 |
| Comparative example 43 | 0.94 | 0.25 | 2200 | — | — |

What is claimed is:

1. A tapered roller bearing comprising an outer ring having a conical raceway, an inner ring having a conical raceway and formed with a large rib surface on the large diameter side of said conical raceway and a small rib surface on the small diameter side thereof, a plurality of tapered rollers rollably arranged between said raceway of said outer ring and said raceway of said inner ring, and a retainer for keeping said tapered rollers circumferentially spaced a predetermined distance from each other, wherein during use, said tapered rollers are guided with large end faces thereof in contact with the large rib surface of said inner ring, characterized in that the small rib surface of said inner ring is formed by a surface parallel to small end faces of said tapered rollers, and that the ratio R/R$_{base}$ is 0.75 to 0.87, wherein R is the radius of curvature of the large end faces of said tapered rollers, and R$_{base}$ is the distance from the apex of the cone angle of said tapered rollers to said large rib surface of said inner ring.

2. The tapered roller bearing as claimed in claim 1 wherein the surface roughness Ra of said large rib surface of said inner ring is 0.05 to 0.20 μm.

3. A gear shaft support device for a vehicle in which a gear shaft is rotatably supported by tapered roller bearings in a housing in which is sealed gear oil, said tapered roller bearings each having an outer ring, an inner ring and tapered rollers, characterized in that a carbo-nitrided layer having a carbon content of 0.80 wt % or more and a Rockwell hardness HRC of 58 or more is formed on each of the surfaces of said outer ring, said inner ring and said tapered rollers, and that the ratio R/R$_{base}$ is 0.75 to 0.87, wherein R is the radius of curvature of the large end faces of said tapered rollers, and R$_{base}$ is the distance from the apex of the cone angle of said tapered rollers to said large rib surface of said inner ring.

4. The gear shaft support device as claimed in claim 3 wherein the surface roughness Ra of said large rib surface of said inner ring is 0.05 to 0.20 μm.

5. A gear shaft support device for a vehicle in which a gear shaft is rotatably supported by tapered roller bearings in a housing in which is sealed gear oil, said tapered roller bearings each having an outer ring, an inner ring and tapered rollers, characterized in that the small rib surface of said inner ring is formed by a surface parallel to small end faces of said tapered rollers, and that the ratio R/R$_{base}$ is 0.75 to 0.87, wherein R is the radius of curvature of the large end faces of said tapered rollers, and R$_{base}$ is the distance from the apex of the cone angle of said tapered rollers to said large rib surface of said inner ring.

* * * * *